US005608580A

United States Patent [19]

Quadri

[11] Patent Number: 5,608,580

[45] Date of Patent: Mar. 4, 1997

[54] ROTARY-PRISM REFRACTING DEVICE FOR OPTICAL EQUIPMENT, SUCH AS A LIGHT PROJECTOR

[75] Inventor: Pasquale Quadri, Albano Sant'Alessandro, Italy

[73] Assignee: Clay Paky S.p.A., Pedrengo, Italy

[21] Appl. No.: 409,175

[22] Filed: Mar. 23, 1995

[30] Foreign Application Priority Data

Mar. 25, 1994 [IT] Italy .................................. T094A0223

[51] Int. Cl.$^6$ ........................................ G02B 5/04

[52] U.S. Cl. .......................... 359/831; 362/284; 362/324

[58] Field of Search .................................. 359/616, 617, 359/831, 837; 362/284, 293, 324

[56] References Cited

U.S. PATENT DOCUMENTS

| | | | |
|---|---|---|---|
| 2,975,668 | 3/1961 | Eckel | 88/1 |
| 3,366,786 | 4/1965 | Delano | 359/616 |
| 3,885,863 | 5/1975 | Mellert | 350/196 |
| 4,079,230 | 3/1978 | Miyauchi | 219/121 L |
| 4,118,109 | 10/1978 | Crawford et al. | 359/837 |
| 4,843,528 | 6/1989 | Pearce-Harvey et al. | 362/277 |
| 4,891,738 | 1/1990 | Richardson et al. | 362/284 |
| 4,984,143 | 1/1991 | Richardson | 362/293 |
| 5,009,471 | 4/1991 | Lee | 359/616 |
| 5,113,332 | 5/1992 | Richardson | 362/284 |
| 5,191,368 | 3/1993 | Kalua et al. | 359/617 |
| 5,402,326 | 3/1995 | Belliveau | 362/284 |
| 5,416,681 | 5/1995 | Wu | 362/284 |

FOREIGN PATENT DOCUMENTS 2268888 1/1994 United Kingdom .

*Primary Examiner*—Timothy P. Callahan
*Assistant Examiner*—Jeffrey Zweizig
*Attorney, Agent, or Firm*—Ladas & Parry

[57] ABSTRACT

A device presenting a disk supporting two prisms and rotating about an axis offset in relation to the path of an incident beam. One of the two prisms is in the shape of part of a circle, and presents a series of faces in the form of parallel portions of the circle, and which are inclined, in relation to a plane perpendicular to their axis, by an angle increasing gradually towards the peripheral face of the prism. The disk and the two prisms are rotated by two electric motors via respective gear assemblies; and the disk is fitted to a shaft also fitted with a gear of the respective gear assembly. Each of the two prisms is integral with a ring gear, and the respective gear assembly presents a gear rotating on the shaft of the disk and meshing simultaneously with both ring gears.

12 Claims, 4 Drawing Sheets

Fig. 9
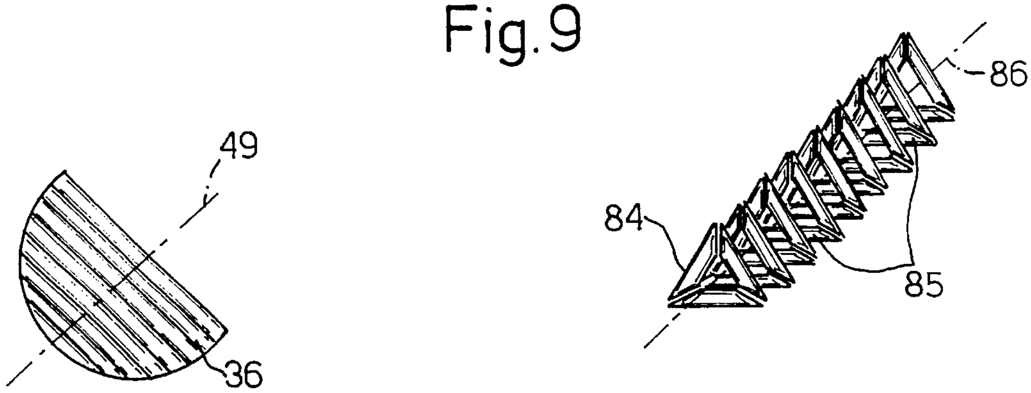
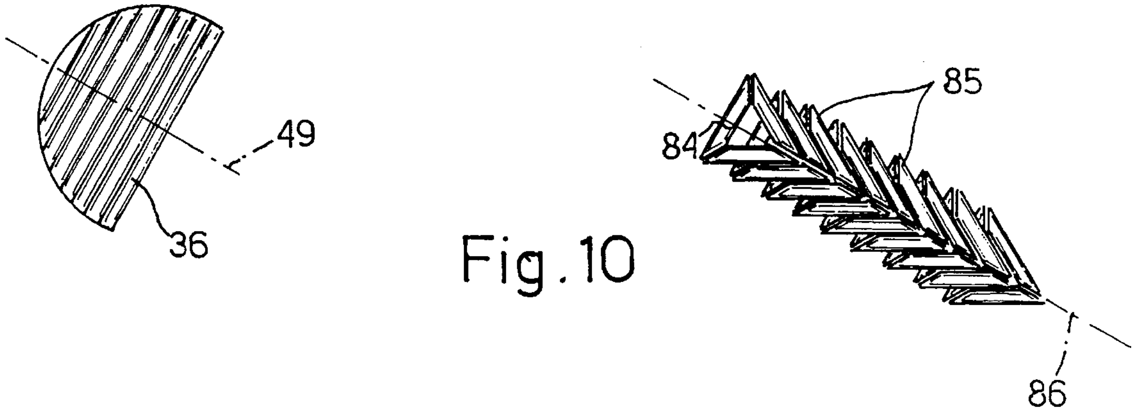
Fig. 10
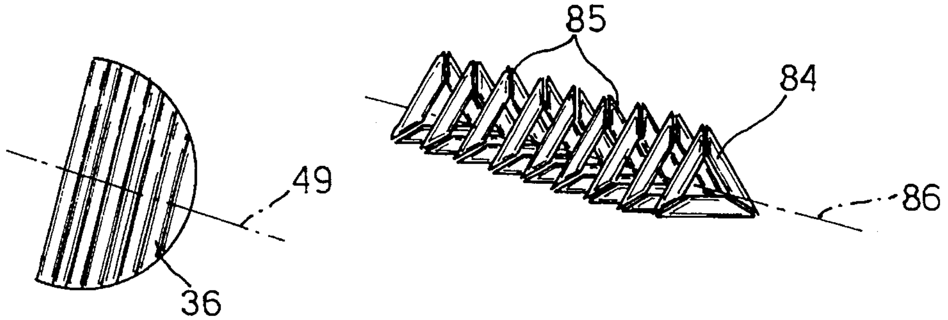
Fig. 11

ROTARY-PRISM REFRACTING DEVICE FOR OPTICAL EQUIPMENT, SUCH AS A LIGHT PROJECTOR

BACKGROUND OF THE INVENTION

The present invention relates to a rotary-prism refracting device for optical equipment, such as a light projector for television or film studios, discothèques, dance-halls or theatres.

Premises requiring special lighting effects normally employ light projectors comprising various elements for controlling the brightness, color, direction and section of the beams, and for directing them on to a given spot.

For split-beam optical effects, optical units are employed wherein a prism is mounted on a movable support by which it is moved into an active position to create the splitting effect. The prism assembly of such units is invariably complex and expensive to produce, and provides for only modest results.

SUMMARY OF THE INVENTION

It is an object of the present invention to provide a highly straightforward diaphragm control refracting device designed to overcome the aforementioned drawbacks typically associated with known devices.

According to the present invention, there is provided a refracting device comprising a movable member for supporting at least one prism and for moving the prism from an idle position to an active position along the path of a light beam; characterized in that said prism has the shape of at least part of a circle with its center along a given axis; said prism comprising a series of faces frontally in the form of parallel portions of said circle; and said faces being inclined, in relation to a plane perpendicular to said axis, at an angle increasing gradually from a substantially diametrical portion to a peripheral portion of said series.

BRIEF DESCRIPTION OF THE DRAWINGS

A preferred, non-limiting embodiment of the present invention will be described by way of example with reference to the accompanying drawings, in which:

FIGS. 9–11 show schematic views of three operating positions of the FIG. 6 prism and the image refracted by it.

DETAILED DESCRIPTION OF THE INVENTION

Figure 1:
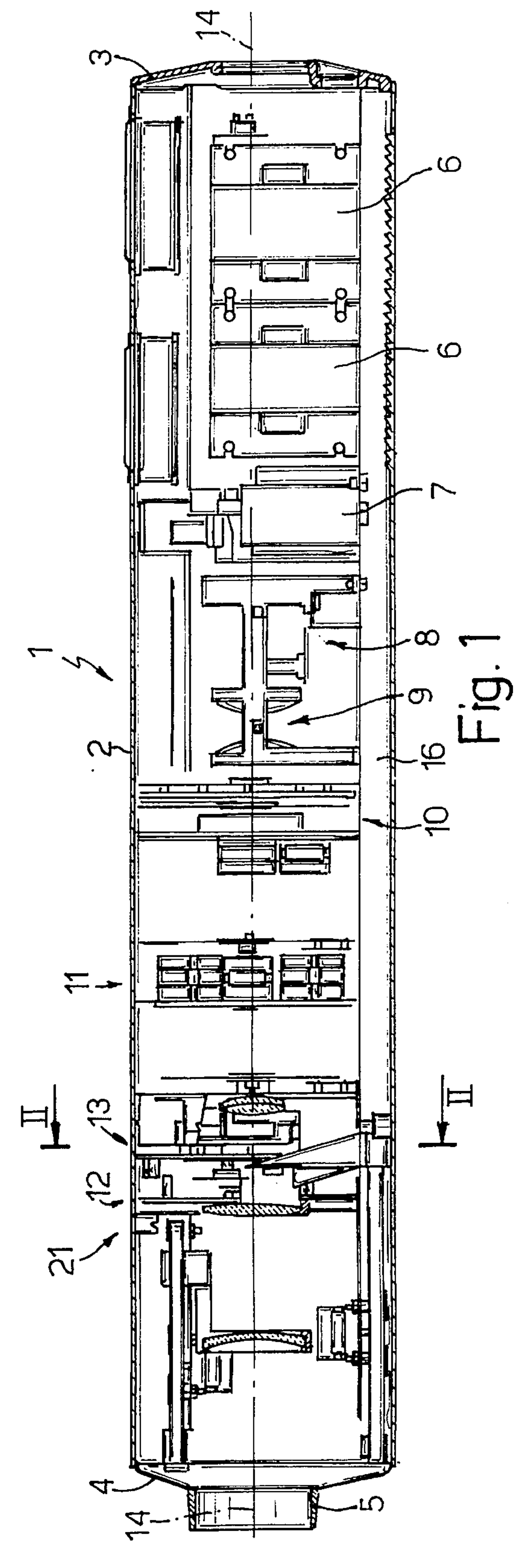
FIG. 1 shows a schematic diametrical section of a light projector featuring a rotary-prism refracting device according to the present invention.

Numeral 1 in FIG. 1 indicates a light projector—e.g. for television or film studios, discothèques, dance-halls or theatres—comprising a substantially prismatic outer casing 2 closed at one end by a rear cover 3 and at the other end by a front cover 4 terminating with a sleeve 5. Casing 2 has a longitudinal axis 14, and a removable flat bottom wall 16.

From rear cover 3 to front cover 4, casing 2 houses the following essential operating units of projector 1: an electric power supply unit 6; a turn-on unit 7; a light source 8; and an optical unit 9 for concentrating the light emitted by source 8 into a beam of a given width along axis 14.

Casing 2 also houses the following operating units for creating special lighting effects: a so-called Iris-Gobos unit 10 for shaping and adjusting the width of the beam; a filter unit 11 for adjusting the color of the beam; a refracting prism unit 12 for multiplying the images projected; and a so-called Frost unit 13 for generating diffused light. Casing 2 also houses a zoom device indicated as a whole by 21.

Prism unit 12 comprises a fixed supporting plate 22 (FIGS. 2 and 3) on the frame of projector 1; and a disk 23 rotating about an axis 24 parallel to but offset upwards in relation to axis 14. Plate 22 has a hole in which is fitted a rolling bearing 26, the inner ring of which is fitted to a shaft 27 coaxial with axis 24 and having a flange 28; and disc 23 is fitted by means of screws 25 to flange 28 so that it is integral with shaft 27.

Figure 2:
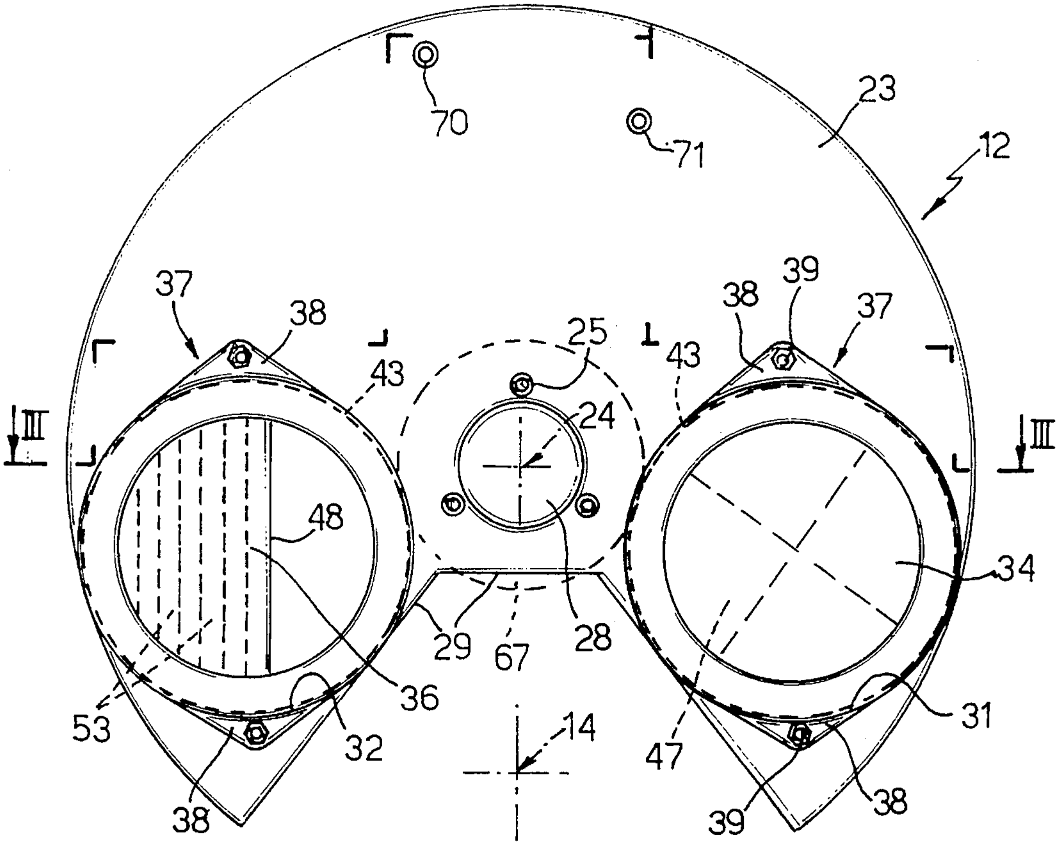
FIG. 2 shows a partial section along line II—II in FIG. 1.
Figure 3:
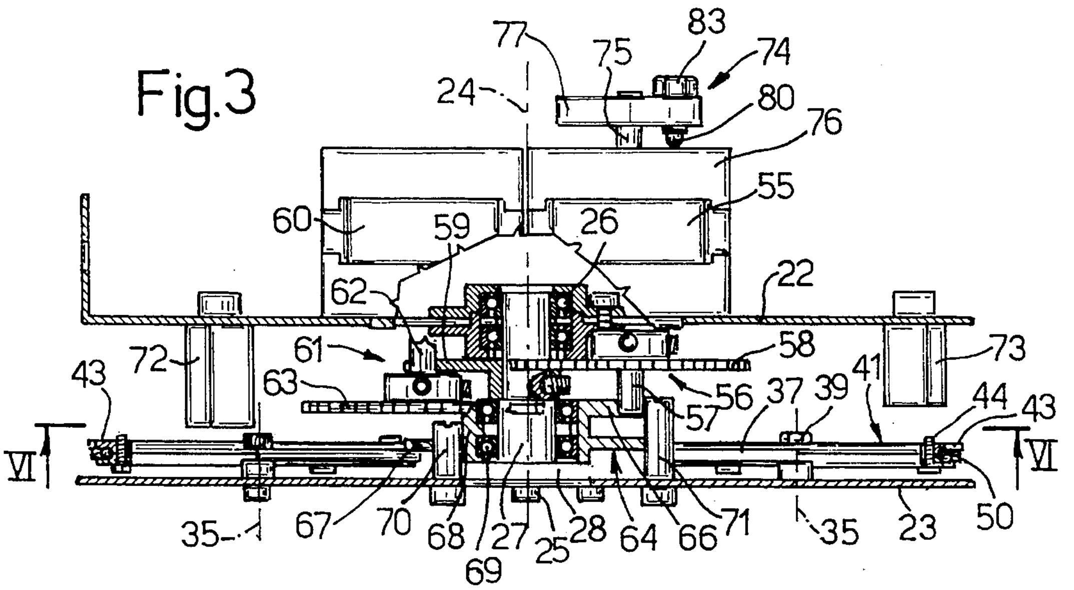
FIG. 3 shows a section along line III—III in FIG. 2.

Disk 23 has a trapezoidal recess 29 for permitting the beam from devices 11 and 13 (FIG. 1) to pass unaltered along axis 14 which, in the idle condition, therefore corresponds with recess 29 as shown in FIG. 2. Disk 23 also has two circular openings 31 and 32 respectively housing refracting prisms 34 and 36.

Figure 4:
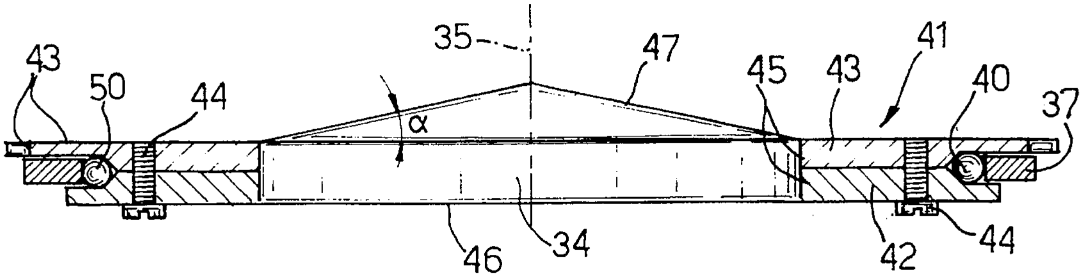
FIG. 4 shows a larger-scale detail of FIG. 3.

At each opening 31, 32, there is provided a substantially annular support 37 having an axis 35 (FIG. 3) and two appendixes 38 (FIG. 2) fixed to disk 23 by means of two screws 39. Inside the opening of each support 37, there is mounted for rotation a frame 41 (FIG. 4) comprising a ring 42 connected to a ring gear 43 by means of screws 44.

Ring 42 and ring gear 43 form a V-shaped outer seat 40 housing a number of balls 50 held against the inner surface of support 37, for reducing the rotational friction of frame 41 on support 37. Ring 42 and ring gear 43 also form an inner seat 45 in which respective prism 34, 36 is fixed by means of silicone so as to rotate about axis 35 of respective support 37, which is parallel to axis 24 of disk 23.

Prism 34 is circular with a flat base surface 46 and a refracting surface in the form of a four-sided pyramid. The lateral surfaces 47 of the pyramid, which present a curved base edge, are inclined at an angle $\alpha$ of a few degrees in relation to base surface 46, so that prism 34 refracts the image of the beam from device 11 into four identical images shifted radially in relation to axis 14 (FIG. 1).

Figure 8:
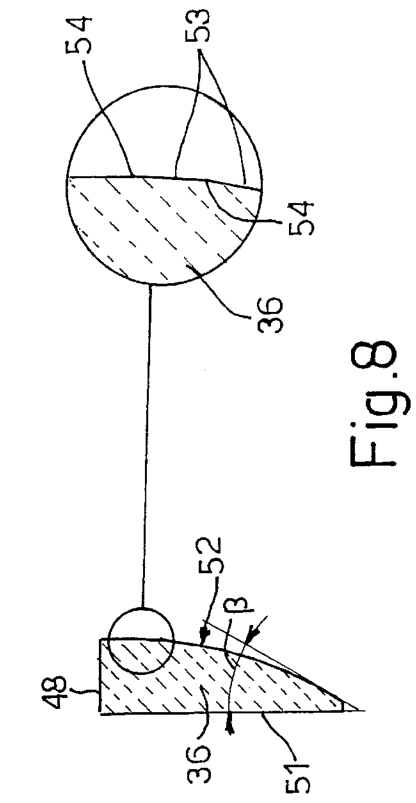
FIG. 8 shows a section along line VIII—VIII in FIG. 7.
Figure 7:
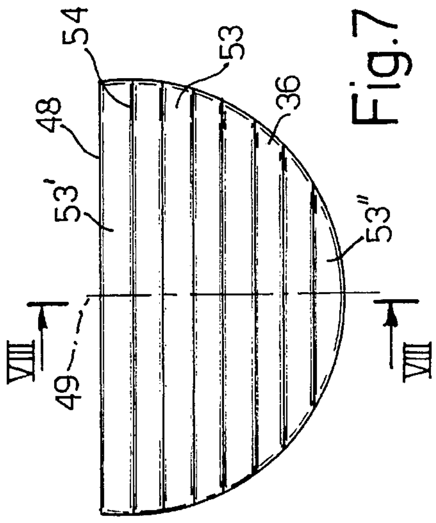
FIG. 7 shows a front view of one of the refracting prisms of the device.

According to one characteristic of the invention, prism 36 is in the form of part of a circle defined by a chord 48 (FIGS. 7 and 8) and presenting an axis 49 perpendicular to chord 48 which is located beyond the center of the circle for fastening prism 36 to respective frame 41 (FIG. 2). Prism 36 (FIGS. 7 and 8) also presents a flat base surface 51, but presents a refraction surface 52 with a substantially cylindrical section along a transverse plane 49, faceted into a series of eight faces 53. Frontally, faces 53 are in the form of portions of a circle parallel to one another and defined by equally spaced chords or edges 54, so that they are all the same width.

The face 53' adjacent to chord 48 is formed by a substantially diametrical portion; the face 53" of the peripheral portion presents only one straight side and only one side in the form of an arc, and forms a given angle $\beta$ with base surface 51; and the other faces 53 and 53' form with base surface 51 an angle increasing gradually from face 53' to face 53". More specifically, the angles of adjacent faces 53 vary by a constant amount, so that prism 36 refracts the incoming beam into eight identical beams shifted in a plane 49 of the prism.

Figure 6:
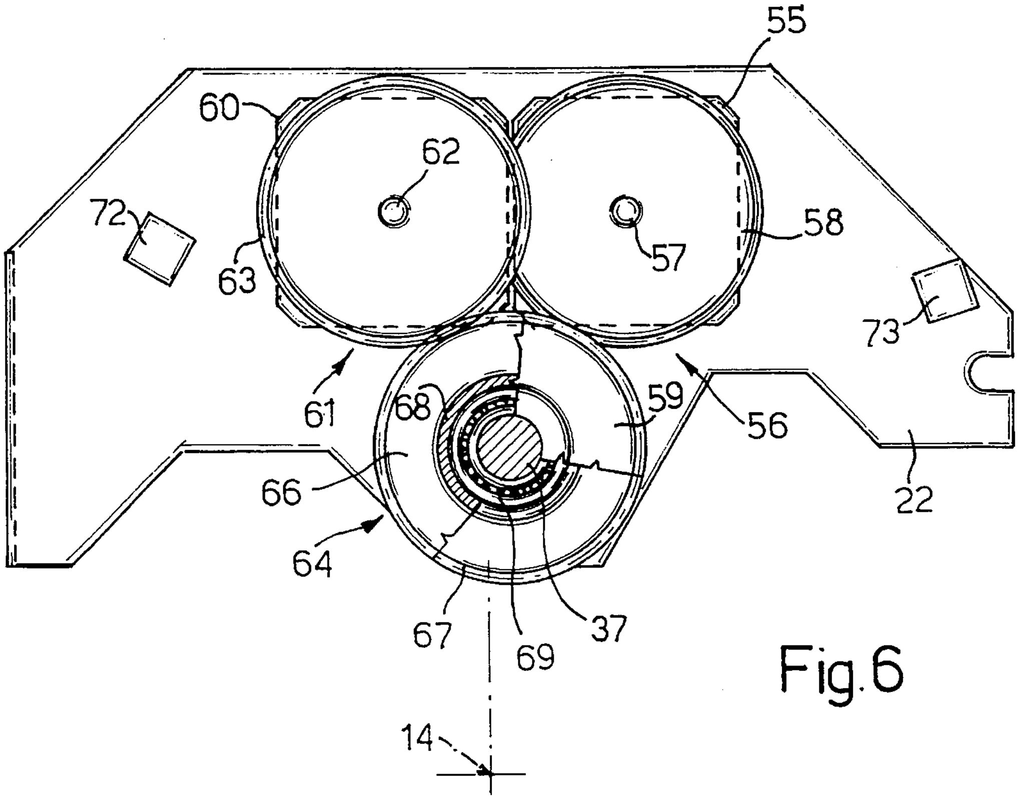
FIG. 6 shows a section along line VI—VI in FIG. 3.

To position prism 34 or 36 along the path of the incident beam, disk 23 is rotated selectively by a reversible electric motor, e.g. a step motor, 55 (FIGS. 3 and 6), and a corresponding gear assembly 56. Motor 55 is fitted to plate 22 and has a drive shaft 57 parallel to axis 24 of disk 23; and gear assembly 56 comprises a gear 58 fitted to drive shaft 57, and a gear 59 fitted to shaft 27 of disk 23 and meshing with gear 58.

Disk 23 (FIGS. 2 and 3) has two pins 70 and 71 for engaging respective stops 72, 73 (see also FIG. 6) fitted to plate 22 and which provide for arresting rotation of disk 23 in two limit positions in which one or other of axes 35 coincides with axis 14 (FIG. 1) of projector 1. Also, to eliminate the flywheel effect due to the weight of the assembly on disk 23 (FIG. 3) and any vibration during rotation of the disk, motor 55 has a brake indicated as a whole by 74.

Figure 5:
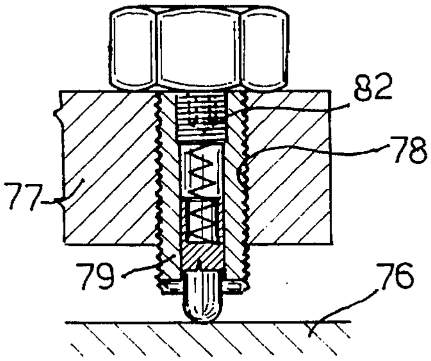
FIG. 5 shows a larger-scale section of a further detail of FIG. 3.

More specifically, drive shaft 57 has an extension 75 extending through the body of motor 55 and beyond support 76, and fitted with a flange 77 having a threaded seat 78 (FIG. 5) in which a threaded sleeve 79 is screwed and locked to flange 77 by a nut 83. Sleeve 79 houses a piston 80 which is pushed towards support 76 by a compression spring 81 located between piston 80 and an adjustable screw 82. Piston 80 terminates in a curved surface engaging the surface of support 76, so that, when shaft 57 is rotated (FIG. 3), piston 80 slides on support 76 to eliminate any vibration of drive shaft 57 and hence of disk 23.

Prisms 34 and 36 are rotated continuously in either direction by a second reversible electric motor, e.g. a step motor, 60 via a further gear assembly 61. Motor 60 is also fitted to plate 22, and has a drive shaft 62 also parallel to axis 24 of disk 23; and gear assembly 61 comprises a gear 63 fitted to drive shaft 62, and a gear 64.

Gear 64 comprises a pair of gears 66 and 67 coaxial and forming one piece with a sleeve 68 rotating on shaft 27 of disk 23 via a rolling bearing 69. Gear 63 meshes with gear 66 of gear 64, while gear 67 meshes simultaneously with the two ring gears 43 of frames 41.

Operation of the refracting device is as follows.

Assuming disk 23 is positioned as shown in FIG. 2, to select prism 36, motor 55 is operated so as to rotate shaft 27 together with disk 23 via gears 58 and 59; and upon pin 70 being arrested against stop 72, axis 35 of respective support 37, and hence of prism 36, is positioned in line with axis 14 of the path of the beam from unit 11 (FIG. 1).

The beam is thus refracted by surface 52 (FIGS. 7 and 8) of prism 36 which, through the opening of seat 45 of the prism, forms, on a given surface, a centered image 84, e.g. a triangle formed in known manner by a so-called Gobo disk of unit 10 (FIG. 1). By means of faces 53, 53' and 53", prism 36 (FIGS. 7–11) also forms a series of images 85 shifted radially along an axis 86 parallel to plane 49.

If motor 60 is now operated, gear 63 rotates gear 64 which in turn rotates the two ring gears 43 together with the two frames 41 so that prism 36 is also rotated. If rotated clockwise, prism 36 successively assumes the positions shown in FIGS. 9–11 wherein the respective main images 84 remain fixed, while the shifted images 85 move parallel to themselves along paths concentric with the main image 84. Finally, if the image generated by the Gobo disk is rotated simultaneously, projector 1 projects a series of images 84, 85 rotating about axis 14 and in which each image in turn rotates about its own axis.

The same applies to selection and rotation of prism 34. As already stated, the effect of prism 34 is to generate four identical images shifted in relation to axis 14; and the effect of rotating prism 34 is to shift the images parallel to themselves along a circular path, or to rotate each image about its axis by means of the Gobo disk.

The advantages of the refracting device according to the present invention will be clear from the foregoing description. In particular, prism 36 generates a highly effective lighting effect, while independent motors 55, 60 and respective gears 56, 61 provide for a highly compact device.

Clearly, changes may be made to the refracting device as described and illustrated herein without, however, departing from the scope of the present invention. For example, provision may be made for a different number of prisms 34, 36; and each prism 34, 36 may be rotated by its own electric motor.

I claim:

1. A light projector comprising a beam emitting light source (8, 9), a gobos unit (10) for shaping said beam, and a rotary-prism device (12) for refracting the thus shaped beam; said device (12) comprising a movable support (23) supporting at least one prism (36) for moving said prism (36) from an idle position to an active position in a path (14) of said shaped beam, and means (60, 63, 64) for rotating said prism (36) about a predetermined axis (35), said prism (36) having a shape of at least part of a circle with its center lying on said axis (35); wherein said prism (36) comprises a series of faces (53, 53', 53") frontally in the form of parallel portions of said circle; said faces (53, 53', 53") being inclined, in relation to a plane perpendicular to said axis (35), at an angle increasing gradually from a first peripheral face (53') of said series to a second peripheral face (53") of said series to refract said shaped beam into a plurality of identical images (84, 85); and wherein said first peripheral face (53') is substantially diametrical on said circle and lies in a plane perpendicular to said axis (35) to refract said shaped beam into a stationary main image (84), the other of said faces (53, 53") refracting said shaped beam into other images (85) of said plurality, which are shifted radially from said main image and are moved parallel to themselves along paths concentric with said main axis (35) as said prism (36) is rotated around said axis (35).

2. A projector as claimed in claim 1, wherein said support comprises a disk (23) rotatable intermittently in opposite directions about a second axis (24) parallel to the axis (35) of said prism (36) and offset in relation to the path (14) of said beam.

3. A projector as claimed in claim 2, wherein said prism (36) is rotatable about its said axis (35); and said disk (23) and said prism (36) are each rotated by a respective electric motor (55, 60) via a respective gear assembly (56, 61).

4. A projector as claimed in claim 3, wherein said motors (55, 60) include respective drive shafts (57, 62) extending parallel to said second axis (24) and offset in relation to said path (14) and said second axis (24).

5. A projector as claimed in claim 4, wherein said disk (23) is fitted to a shaft (27) coaxial with said second axis (24); said coaxial shaft (27) being rotated by said motor (55) of said disk (23); and said gear assembly (56) of said disk (23) comprising a gear (59) fitted to said shaft (27).

6. A rotary-prism refracting device for optical equipment, such as a light projector, the device comprising a movable support (23) for supporting at least one prism (36) and for moving the prism (36) from an idle position to an active position in the path (14) of a light beam, said prism (36) being in the shape of at least part of a circle with its center on a first axis (35); wherein said prism (36) comprises a series of faces (53, 53', 53") frontally in the form of parallel portions of said circle; said faces (53, 53', 53") being inclined, in relation to a plane perpendicular to said axis (35), by an angle increasing gradually from a first peripheral face (53') of said series to a second peripheral face (53") of said series; and wherein said support comprises a disk (23) rotatable intermittently in opposite directions about a second axis (24) parallel to said first axis (35) and offset in relation to the path (14) of said beam; said prism (36) also being rotatable about said first axis (35); said disk (23) and said prism (36) each being rotated by a respective electric motor (55, 60) via a respective gear assembly (56, 61), said motors (55, 60) including respective drive shafts (56, 62) extending parallel to said second axis (24) and offset in relation to said path (14) and said second axis (24); the drive shaft (57) of said disk (23) being provided with a brake (74) for eliminating vibration and flywheel effect.

7. A device as claimed in claim 6, wherein said brake comprises an elastic element (80) fitted to said drive shaft (57) and so arranged as to slide on the surface of a fixed member (76) as said drive shaft (57) rotates.

8. A rotary-prism refracting device for optical equipment, such as a light projector, the device comprising a movable support (23) for supporting at least one prism (36) and for moving the prism (36) from an idle position to an active position in the path (14) of a light beam, said prism (36) being in the shape of at least part of a circle with its center along a first axis (35); wherein said prism (36) comprises a series of faces (53, 53', 53") frontally in the form of parallel portions of said circle; said faces (53, 53', 53") being inclined, in relation to a plane perpendicular to said axis (35), at an angle increasing gradually from a first peripheral face (53') of said series to a second peripheral face (53") of said series; and wherein said support comprises a disk (23) rotatable intermittently in opposite directions about a second axis (24) parallel to said first axis (35) and offset in relation to the path (14) of said beam; said prism (36) being rotatable about said first axis (35); said disk (23) and said prism (36) each being rotated by a respective electric motor (55, 60) via a respective gear assembly (56, 61), said motors (55, 60) including respective drive shafts (56, 62) extending parallel to said second axis (24) and offset in relation to said path (14) and said second axis (24); said prism (36) comprising an integral ring rear (43); said gear assembly (61) of said prism (36) comprising a gear (63) fitted to the respective shaft (62) and meshing with a gear (64) rotatable on the shaft (27) of said disk (23).

9. A device as claimed in claim 8, wherein said gear (64) on the shaft (27) of said disk (23) comprises a pair of gears (66, 67) coaxial and integral with each other; a first gear (66) in said pair meshing with said gear (63) fitted to said drive shaft (62); and a second gear (67) in said pair meshing with said ring gear (43).

10. A device as claimed in claim 8, wherein said disk (23) supports at least two different prisms (34, 36) and is rotated selectively for setting one of said prisms (34, 36) into the active position; each of said prisms (34, 36) comprising an integral respective said ring gear (43); and said gear (64) on the shaft (27) of said disk (23) meshing simultaneously with said ring gears (43).

11. A device as claimed in claim 8, wherein said prism (34, 36) is held by a frame (41) comprising a ring (42) and said ring gear (43); said frame (41) being rotatable in a fixed annular seat (37) and comprising an inner seat (45) in which said prism (34, 36) is fixed.

12. A device as claimed in claim 11, wherein said ring (42) and said ring gear (43) also form an outer seat (40) housing a number of rolling elements (50) rollingly supported in said annular seat (37).

* * * * *